United States Patent [19]

Hallsten et al.

[11] Patent Number: 5,545,358
[45] Date of Patent: Aug. 13, 1996

[54] TANK COVER STRUCTURE WITH AERATION DISTRIBUTION

[75] Inventors: Jeffrey A. Hallsten, Sacramento, Calif.; Elena Bailey, Austin, Tex.

[73] Assignees: Hallsten Corporation, Sacramento, Calif.; Enviroquip, Inc., Austin, Tex.

[21] Appl. No.: 425,930

[22] Filed: Apr. 20, 1995

[51] Int. Cl.⁶ ............................................ B01F 3/04
[52] U.S. Cl. ........................................ 261/123; 261/121.1
[58] Field of Search .................................. 261/123, 121.1

[56] References Cited

U.S. PATENT DOCUMENTS

| | | | |
|---|---|---|---|
| 3,206,032 | 9/1965 | Nottingham et al. | 261/121.1 |
| 3,271,304 | 9/1966 | Valdespino et al. | 261/121.1 |
| 3,679,187 | 7/1972 | Smith. | |
| 3,925,522 | 12/1975 | Schreiber | 261/121.1 |
| 4,287,062 | 9/1981 | Nordenskjold | 261/121.1 |
| 4,329,234 | 5/1982 | Cikut et al. | 261/121.1 |
| 4,421,696 | 12/1983 | Grave et al. | 261/123 |
| 4,720,360 | 1/1988 | Melber | 261/123 |
| 4,863,644 | 9/1989 | Harrington et al. | 261/123 |
| 4,938,899 | 7/1990 | Oros et al. | 261/123 |
| 5,160,714 | 11/1992 | Hardison | 261/123 |
| 5,325,646 | 7/1994 | Hallsten et al. | 52/246 |

OTHER PUBLICATIONS

Hallsten Corporation "We Offer Environmental Solutions" Brochure (undated); Sacramento, CA 95841.

Enviroquip, Inc. Austin, Texas 78766, Product Specifications for "Air Distribution Piping And Aeration Equipment" (Apr., 1987).

*Primary Examiner*—Tim R. Miles
*Attorney, Agent, or Firm*—Thomas M. Freiburger

[57] ABSTRACT

A substantially gas tight tank cover is designed such that the structural beams of the cover serve also as an air distribution system for bubbling air through a liquid in the tank. Vertically oriented gas bubbler and orifice devices include hardware enabling easy access to the orifice and bubbler from the top of the tank cover. The design is such that all necessary maintenance including major repairs can be performed from the cover without draining the basin or removing the cover. The system is particularly adaptable to sewage treatment plants, but is advantageous for other applications as well, wherein gases are to be bubbled through liquids at multiple locations.

12 Claims, 6 Drawing Sheets

5,545,358

TANK COVER STRUCTURE WITH AERATION DISTRIBUTION

BACKGROUND OF THE INVENTION

The invention relates to air or gas distribution systems generally. More specifically the invention is concerned with distribution of air or other gas to a system of liquid-containing tanks, wherein the gas is to be bubbled up through liquid contained in the tanks, as in the case of a sewage treatment plant.

U.S. Pat. Nos. 4,720,360 and 4,863,644, owned by Enviroquip, Inc., disclose air or gas distribution structures primarily for use in waste water treatment plants, for aeration of the waste water being treated. The apparatus disclosed in the patents is intended to promote even distribution of gas among injection pipes, to produce small diameter gas bubbles for wide distribution in the liquid and to prevent clogging of gas orifices.

U.S. Pat. No. 5,325,646 of Hallsten Corporation discloses a tank or channel cover structure wherein one or more extruded structural members, tubular in cross section, support a flat, arched or domed cover from the edges of a tank or channel. The cover structures disclosed in the patent are adaptable for many purposes, including sewage treatment plants.

Previously, sewage treatment plants have required a network of pipes for distribution of air used in aeration of the sewage sludge contained in tanks. Such piping might be run along the surface at the exterior of a tank or sludge channel, with a series of branch pipes emerging from a main distribution pipe, in order to serve the entire area of the tank or tanks. Such a network of piping has been difficult to control as to even distribution of air or gas through the many downwardly extending bubbler pipes with gas orifices, and an orifice has typically been included on each gas bubbler pipe as a flow controller so that the system can be manually balanced as closely as possible by use of various orifice sizes. Typically these orifices have been beneath the surface, making them subject to clogging and difficult to access and making balanced distribution nearly impossible. In addition, some sewage treatment tanks of this nature are now required to be covered rather than open to the air as in the past. The covering of these tanks is complicated by the network of pipes, and accommodation must be made for these pipes.

It has been known prior to this invention to utilize foot bridge structure over an open sewage treatment tank as part of the air distribution means leading to drop pipes and bubblers. However, many different considerations, and also different structures, are involved in the case where a tank cover is provided to substantially totally seal the tank's interior from the atmosphere.

It is an object of this invention to utilize tank or channel cover structure such as disclosed in the above referenced U.S. Pat. No. 5,325,646 as not only structure covering a tank but also as a means or instrumentation for carrying the air or other gas to be distributed to various bubbler devices throughout the tank; and to employ diffuser structure of the type disclosed in U.S. Pat. Nos. 4,720,360 and 4,863,644. Thus, the invention uses the structure of U.S. Pat. No. 5,325,646 for two purposes simultaneously, therefore avoiding a network of pipes which would normally be provided to reach each vertical bubbler device and establishing an efficient system of built-in air channels for distribution of the gases, while allowing a closed and sealed tank system to have all bubblers/diffusers and orifices accessible from above the tank cover.

SUMMARY OF THE INVENTION

In one form of the present invention, a tank cover structure, which spans over a tank adapted to contain a liquid, includes a gas distribution system for delivering gas to be bubbled up through liquid in the tank at multiple locations. At least one tank cover has one or more structural beams spanning across at least a portion of the distance spanned by the tank cover and supporting at least a portion of the tank cover, with the beam having a closed, generally tubular cross section which may be generally rectangular or any other shape adapted for structural efficiency. A gas delivery means is connected to one end of each of the structural beams so as to establish fluid communication with the interior of the beam. Gas bubbling devices are connected to the beam at preselected spacings, with each gas bubbling device including a substantially gas-tight connection with the beam, a drop pipe or tube extending downwardly into the tank, and a gas bubbler outlet or diffuser on the pipe below the beam, positioned to be submerged in the liquid.

In one preferred embodiment an orifice member is connected to each gas bubbling device and is accessible from above the liquid in the tank, preferably from the top of the cover, so as to enable any necessary changing of the flow rate of gas to be delivered down through the pipe and through the gas bubbler outlet, by substituting a larger or smaller orifice, and also to allow any needed cleanout of the drop pipe and gas bubbler outlet from the cover. Preferably, the gas tight connection between the pipe and the structural beam is located on the lower side of the beam, and the orifice member is located at the upper side of the beam so as to be accessible to a person on the exterior of the tank cover.

In a specific embodiment there are included a plurality of gas bubbling devices or diffusers on each said structural beam, with the gas bubbler outlet of each bubbling means being supported at or near the bottom of a drop pipe.

Further, there may be included observation openings in the tank cover at a position which enable visual observation of the gas bubbler outlets, so that one may determine any blockage or other problem with a gas bubbler outlet. A plug device is included for installation into the observation opening, for substantially sealing the opening.

It is an important feature of the invention that the drop pipes have air orifices which are located accessibly from the cover, i.e. on the hollow structural beam. As in the above cited prior patents of Enviroquip, Inc. (particularly U.S. Pat. No. 4,720,360), the air discharge orifice members are each installed vertically, with an access device preferably exposed at the top of the beam. Thus, a screw slot or hex head is accessible by a simple tool to remove the orifice device for rodding out the drop pipe, for example, or for replacing the orifice with a different size orifice. This is particularly important and advantageous in a closed, substantially sealed tank because it enables cleanout or other servicing of the gas bubbler or diffuser assembly from above, without requiring opening of the tank and releasing contaminated or malodorous gases. When the orifice device is unscrewed and removed at the top of the drop pipe, preferably from above the hollow beam, this does not release the odorous gases of the sewage sludge, contained above the liquid within the tank, to the atmosphere.

Accordingly, the system of the invention enables aeration diffusers of a tank to be inspected for clogging by low-skilled personnel working on top of the cover, and such personnel are able to unclog the aeration diffusers from above when the preferred apparatus of the invention is employed, without releasing deleterious gases to the atmosphere. If process changes occur in the sewage treatment system, aeration diffuser orifices may be changed very quickly by low-skilled personnel working on the cover. Such access to the gas bubblers or aeration diffuser devices requires an opening no more than two inches in diameter, and this diameter may be only about one inch.

It is thus seen that the system of the invention eliminates a number of distribution pipes which have typically increased the expense of an aeration system at a sewage treatment plant in particular, and which tend to interfere with the closure and sealing of a tank by a cover. Efficiency and economy are achieved by utilizing the hollow interior of the tubular structural beams inherent in the tank cover structure according to U.S. Pat. No. 5,325,646, and in adding relatively simple and inexpensive hardware to such hollow structural beams, preferably the apparatus described in U.S. Pat. Nos. 4,720,360 and 4,863,644, in order to provide for direct, efficient vertical delivery of air or gas downwardly to a diffuser submerged in the tank and to provide an easily accessible orifice device which allows servicing without opening the essentially sealed tank cover.

It is therefore among the objects of the invention to improve over previous gas distribution/diffuser systems intended to bubble gas through liquid, specifically in the case of sewage treatment or other liquid treatment plants wherein air is bubbled through liquid, by utilizing a tank or channel cover structure to close the tank and also as an instrumentality of gas distribution, with a simple and accessible connection at each drop pipe. A related object is to improve over previous covered gas distribution/diffuser systems, by incorporating a vertically oriented orifice device into the structural cover beam with means to enable all required maintenance of the orifice and gas bubblers to be performed on the cover, without releasing odorous or contaminated gases. These and other objects, advantages and features of the invention will be apparent from the following description of a preferred embodiment, considered along with the accompanying drawings.

DESCRIPTION OF PREFERRED EMBODIMENTS

Figure 1:
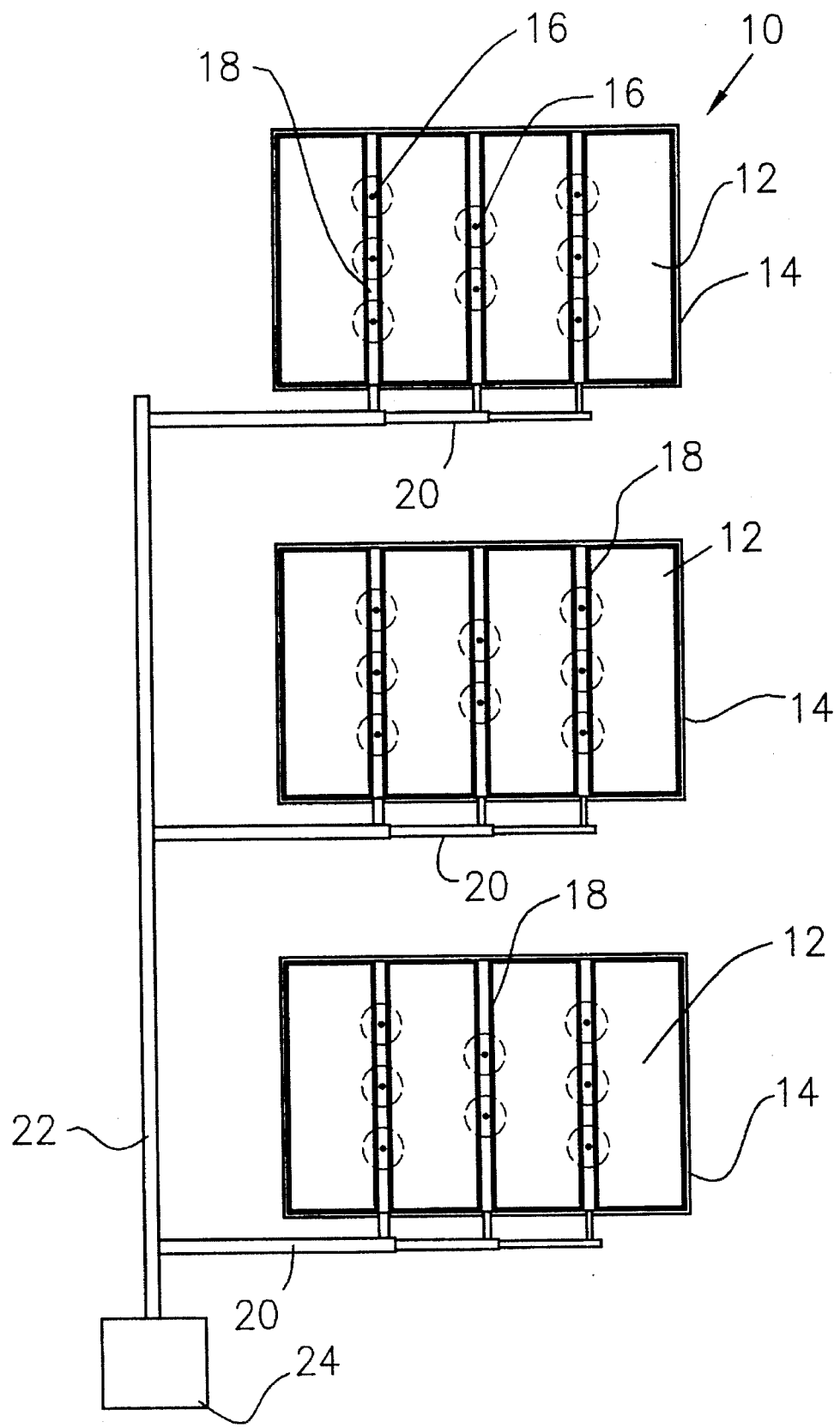
FIG. 1 is a schematic plan view indicating a layout for air bubblers and air distribution in a series of tanks of a sewage treatment plant, in which the system of the invention may be incorporated.

In the drawings, FIG. 1 shows a schematic layout 10 which may be for a sewage treatment plant, wherein air or other gas is bubbled up through liquid (not shown) below the covers 12 of one or more tanks 14. The system 10 includes a plurality of air bubbler devices 16, each connected to an air distribution branch line 18 as schematically indicated in the drawing. The air bubbler devices 16 each have a drop pipe and a bubbler outlet or diffuser, as explained further below. FIG. 1 also shows that one end of each of the air branch lines 18 is connected to a trunk line 20, and the trunk lines 20 serving the plurality of tanks are connected into a main air supply line 22. This is fed by an air compressor 24 which supplies all of the tanks 14 shown in the schematic view of FIG. 1. Typically, the pressure delivered by the system to each air bubbler is around 7 to 8 psi. The output pressure at the compressor 24 is somewhat higher.

Figure 2:
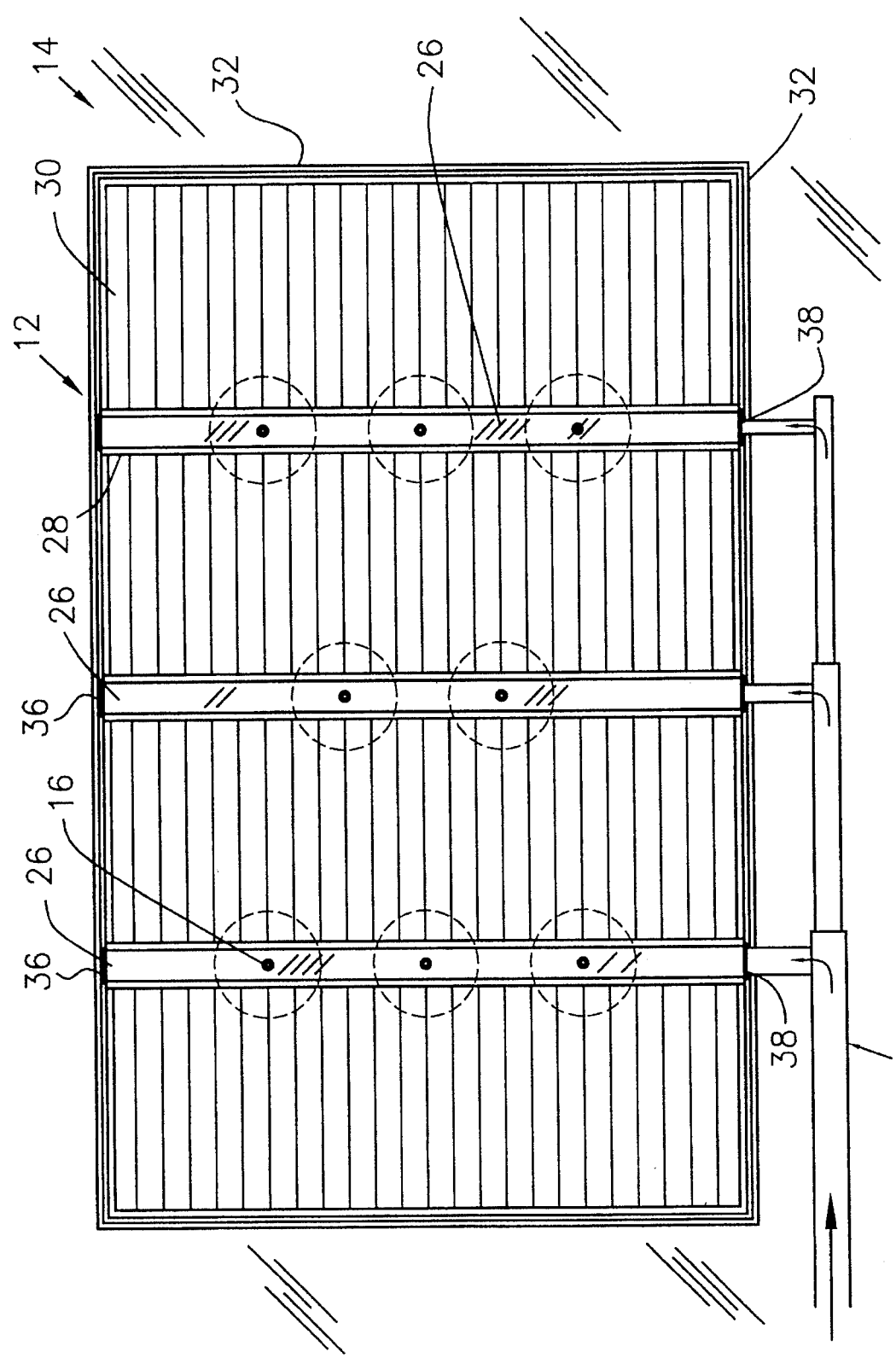
FIG. 2 is another plan view showing an example of a tank cover structure in accordance with the invention, with structural beams being utilized for gas distribution.

FIG. 2 shows one of the tanks 14 in greater detail. Such a tank may typically be an in-ground concrete tank, liquid-impervious, within which air bubbling occurs in a sewage treatment plant (other constructions are possible). In accordance with the principles of this invention, the bubbler devices 16 are secured to main structural beams 26 which serve as the branch air lines 18 shown in FIG. 1. These structural beams, and connecting structural support members 28 and deck planks 30, preferably are as disclosed in U.S. Pat. No. 5,325,646 and also in copending application Ser. No. 270,010, now abandoned, the disclosures of both of which are incorporated by reference herein. Structural beams 26 rest on fixed rim or ledge structure 32 of the tank, being sized to span across the width of the tank 14 and allowing for live load including persons walking on the tank cover assembly 12. As disclosed in the above referenced issued patent and application, the beams 26 are hollow, preferably formed of extruded aluminum. These beams 26 serve as conduits for air delivered under pressure through the trunk air line 20, being closed by caps 36 at remote ends and being closed except for a fitting flange 38 at the air receiving ends. The fittings 38 are sealed with the ends of the beams 26 and with the trunk air line 20, which may comprise serially decreasing cross-sectional areas as it reaches each branch distribution line as indicated. Examples of the closure caps 36 and fittings 38 will be discussed below.

Figure 3:
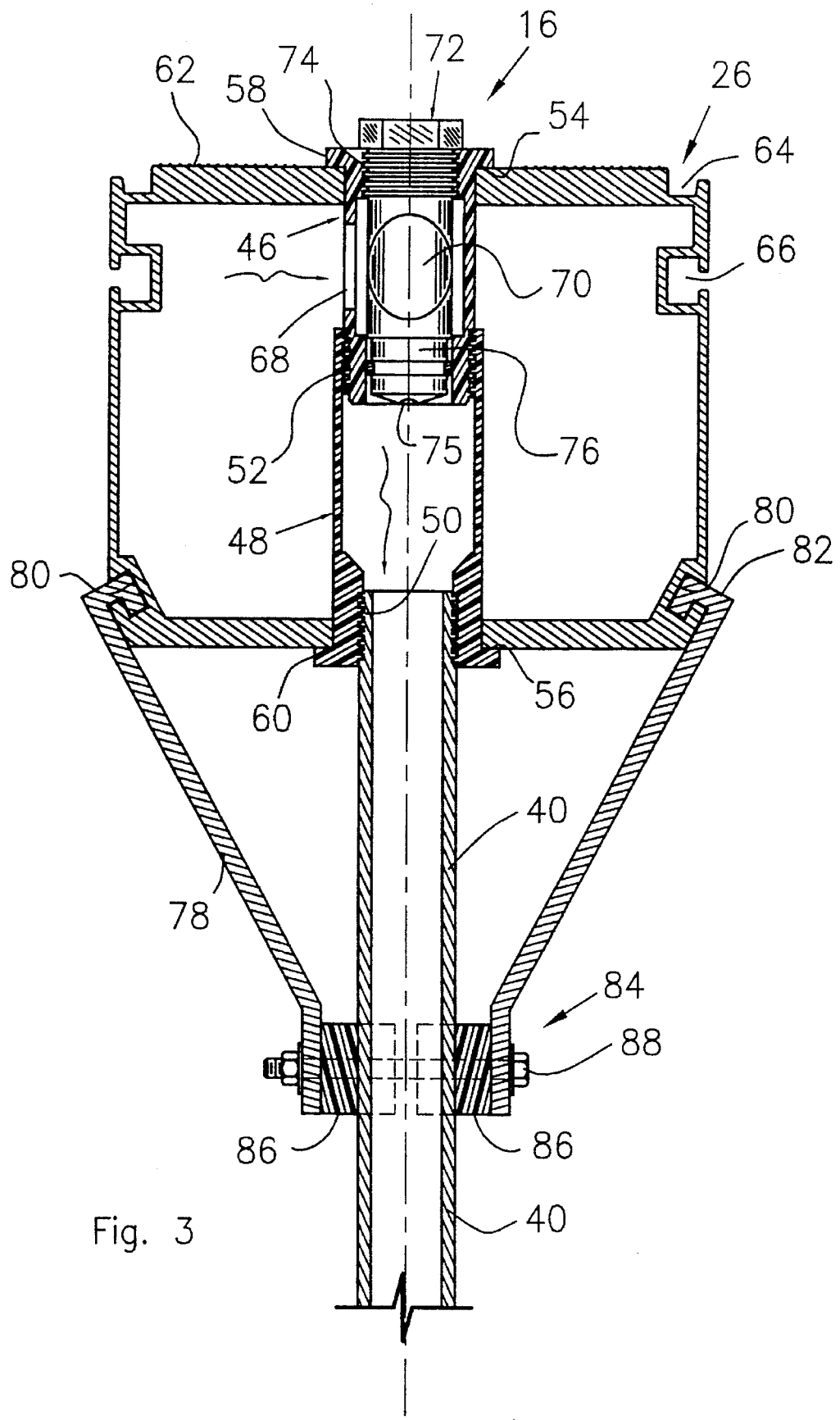
FIG. 3 is an elevational cross section view showing a structural member of the tank cover structure as used for air distribution, with a bubbler pipe and orifice device connected to the structural member.
Figure 4:
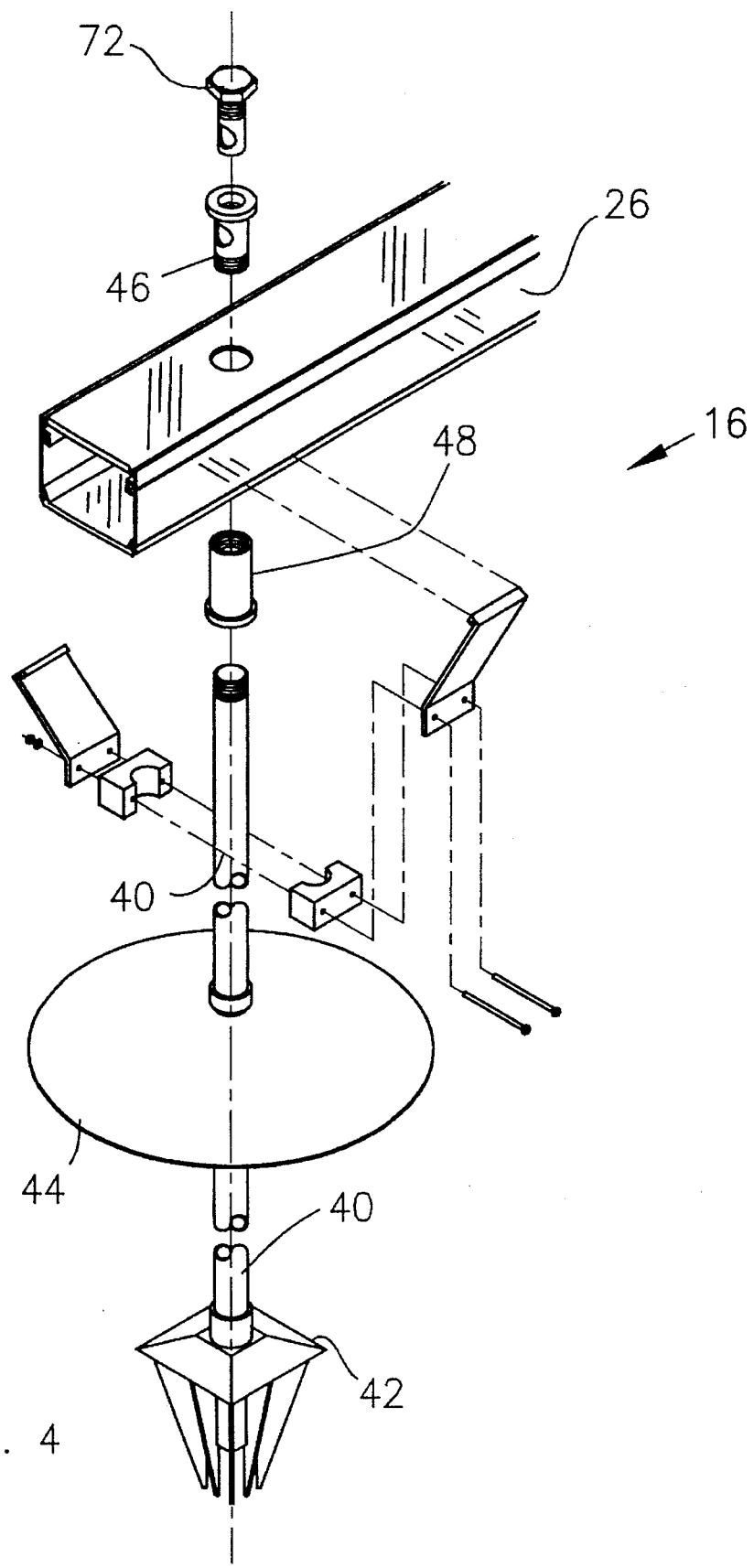
FIG. 4 is an exploded view in perspective, showing a preferred embodiment of a bubbler/diffuser/drop pipe assembly and its manner of connection into the hollow structural tank cover beam.

FIG. 3 shows in detail one embodiment of an interconnection between a gas bubbler device 16 and the hollow structural beam 26. FIG. 4 also shows this preferred assembly in exploded view. Referring to both FIGS. 3 and 4, a drop pipe is shown at 40, forming a part of the bubbler assembly 16 and extending down to a selected position in the liquid contained in the tank, for delivering air for aeration through the liquid. The equipment shown in FIG. 4 comprises air bubbling equipment sold by Enviroquip, Inc., which may be disclosed in U.S. Pat. Nos. 4,720,360 and 4,863,644. A primary advantage of this type of system is that the air outlet at the bottom of the drop pipe is of large diameter, e.g. one inch, preventing clogging. Air exiting this outlet is diffused into small bubbles by an air diffuser 42 and by an upper deflector 44 which contributes to diffusion.

The structural beam 26 has holes drilled at top and bottom as indicated, at each location where a bubbler assembly 16 is to be installed. A tubular collar member or upper sleeve 46, formed of a strong plastic material such as ABS or Zytel, for example, is inserted down through the upper opening, as shown. A mating tubular sleeve 48, which provides a female thread 50 for receiving the upper end of the drop pipe 40, is assembled up through the lower hole, and the two sleeves 46 and 48 are screwed together via threads 52. The lower sleeve 48 may be formed of the same material as the upper sleeve 46, and provision is made for sealing both the upper and lower sleeves 46 against the hollow structural beam 26, as well as for sealing the threads 52 together. As an alternative the lower sleeve 48 may be formed of a thermoplastic elastomer (TPE) such as Santoprene, with the elastomeric properties helping to absorb and dampen vibrations associated with the operation of the bubbler assembly 16. Seals at the beam 26 can be made, for example, by inclusion of gaskets 54 and 56 engaging below heads 58 and 60 of the two tubular sleeves 46 and 48, respectively, while the threads 52 may be sealed by conventional means such as Teflon tape or liquid thread sealant (if a TPE is used for the lower sleeve 48, generally no thread sealant will be necessary at 52). The upper and lower sleeves 46 and 48 thus define in essence a single generally tubular member which extends through the height of the structural beam 26 and which is connected in sealed relationship at both top and bottom of the beam 26.

It should be understood that the structure of the gas bubbler device 16 shown in FIGS. 3 and 4 represents a preferred embodiment, but other arrangements can be used. For example, an orifice device 72 shown in the figures could be eliminated if the top 58 of the upper sleeve 46 were solid, with, e.g., a hex head or screw driver slot for engagement by a tool. The orifice 75 could then be built into the bottom of this upper tubular sleeve 46, thus requiring fewer parts (as shown in FIG. 3, the orifice 75 can be formed in a portion 76 which is press-fit into the upper portion of the orifice member 72 in the embodiment shown). For servicing or for changing the orifice size, the modified upper sleeve component 46 would then be removed, and this component could be replaced by a similar component with a different orifice size when desired. For such an embodiment the lower tubular sleeve component 48 should be either adhered to the bottom side of the structural beam 26 or press-fit into the hole provided in the bottom of the beam 26, so that the sleeve component 48 remains in place if the upper component 46 is removed. Other structural arrangements could also be used. The drop pipe 40 could be threaded into the bottom hole of the beam itself; a sleeve member with orifice could be fitted into the beam entirely from the top (it could be threaded into the top hole of the beam), with provision for sealing the bottom of the sleeve member against the drop pipe. A portion or all of the sleeve member could be elastomeric (TPE) for this purpose and to dampen vibrations from the drop pipe.

As can be seen from the drawing, the structural beam 26 may be similar in cross section to beams disclosed in U.S. Pat. No. 5,325,646 and in pending application Ser. No. 270,010, both of which are incorporated herein by reference. Thus, the hollow beams 26 may each have an upper surface 62 which is adapted to form part of a deck or walking surface. Similarly, these beams may have recesses 64 and 66 for receiving and securing structural members 28 which serve to support a plurality of deck planks, i.e. the deck planks 30 seen in FIG. 2. The hollow beam carries pressurized air or gas for distribution to the gas bubbler assemblies 16. As can be seen from FIGS. 3 and 4, air is permitted to enter the gas bubbler assembly 16 only at one or more openings 68 positioned around the periphery of the upper tubular sleeve 46. The pressurized air thus enters an opening 70 in the orifice device generally identified as 72 in the drawing, comprising generally a plastic spool. As indicated, the orifice device 72 is screwed into the upper tubular member 46 by threads 74. The only other opening in the orifice member 72 is the orifice 75 at the bottom side of the device, the size of which regulates the flow rate of air through the bubbler assembly 16.

From the orifice 75, the pressurized air passes down through the lower threaded tubular member 48 and into the drop pipe 40, which preferably is screwed into the lower member 48. The pressurized air, in a preferred embodiment, then exits at the bottom of the drop pipe 40 at the air diffuser 42, which diffuses the air into smaller bubbles, this being further enhanced by the upper deflector 44 which forms a part of the air diffusion apparatus.

FIG. 3 shows struts or braces 78 on opposed sides of the drop pipe 40, for bracing and stabilizing the drop pipe 40 as it extends downwardly from the assembly at the beam 26. These struts 78, which may have a width of about 4 inches to 12 inches for stability, are positioned in extruded slots 80 of the beam 26 in the preferred embodiment illustrated. J-shaped ends 82 of the extruded struts 78 are closely fitted into the extruded slots 80, so that lateral stability is afforded (in and out of the drawing sheet as seen in FIG. 3), thus the width of each strut 78 helps contribute to stability in one direction. Stability in the other direction is afforded by the generally triangular shape of the assembly, with the two struts 78 extending down to a joint 84 with the drop pipe, this joint being made in a preferred embodiment by a pair of opposed clamp blocks 86 (see both FIGS. 3 and 4). The clamp blocks each engage a portion of the arc of the drop pipe 40, and are secured together and to the struts 78 by fasteners 88. The J-shaped ends 82 can be configured and angled such that a mild deflection of each strut 78 occurs when the fasteners 88 are drawn tight, to rigidify the connections at the extruded slots 80. Although this stabilizing arrangement is preferred in the embodiment shown, other stabilizing arrangements and structure can be employed.

Figure 5:
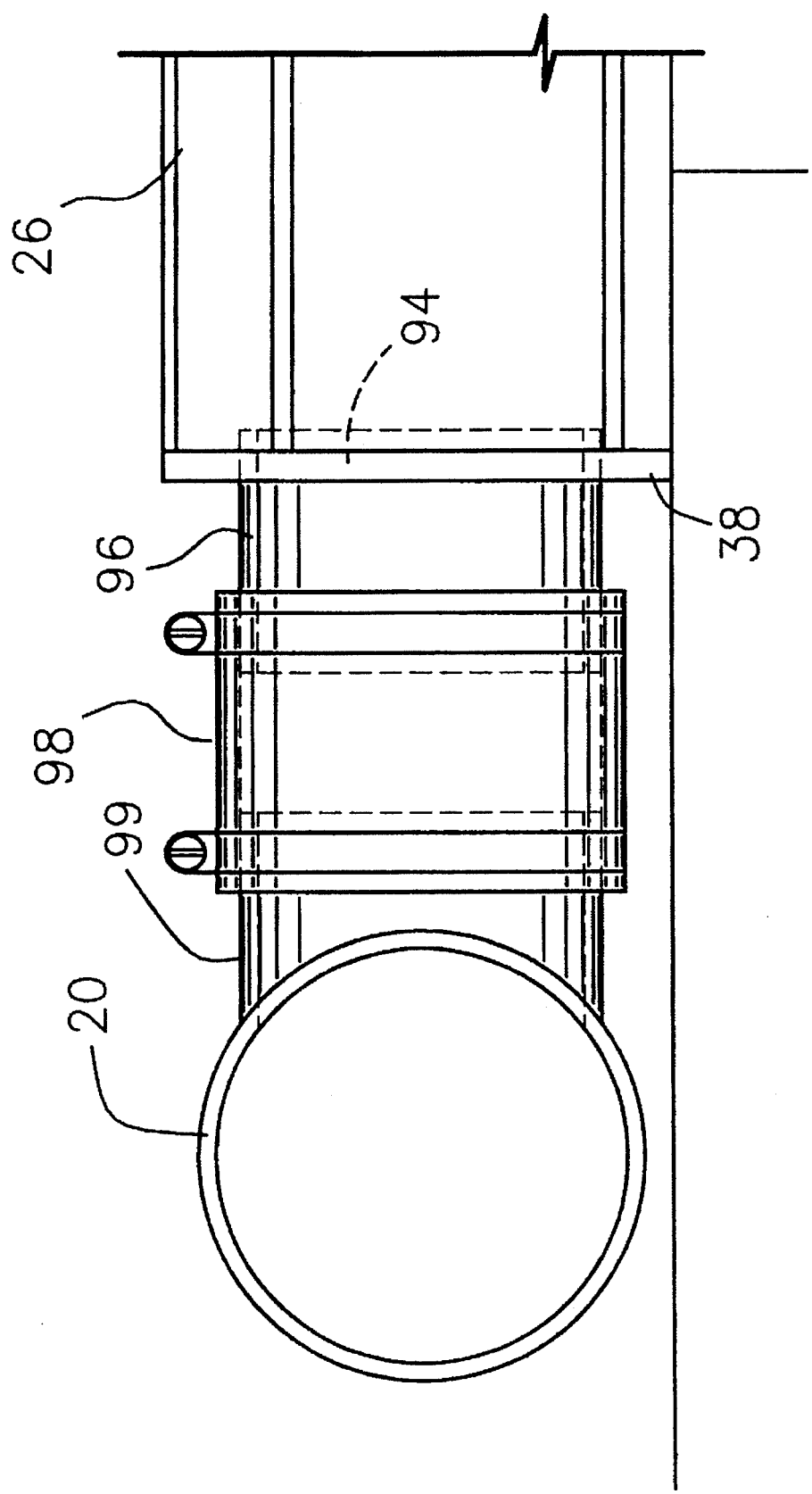
FIG. 5 is a side elevation view showing the end of a hollow structural tank cover beam, with one arrangement for connection into a gas distribution tube.

FIG. 5 illustrates somewhat schematically an example of a connection between one of the air-conducting beams 26, serving as a branch line in the air distribution system, and a pipe or tube 20 which serves as a trunk line in the system, as shown in FIGS. 1 and 2. FIG. 5 illustrates that the structural beam 26 may be fitted with an elastomeric end stopper or plug 38 which is contoured to fit into the shape shown in cross section in FIG. 3. The end plug 38 may be formed of a rubber-modified plastic material or TPE, one which is resistant to ultraviolet light, since the end of the structural member 26 will often be exposed to the elements. Welding of a metal plate or flange plate to the end of the beam 26 (preferably aluminum, since the beam 26 will usually be aluminum) is an alternative, as is screwing a plate onto the end of the beam with bolts and tapped holes, and with a gasket positioned between the two components.

In any event, the trunk line 20 is connected into an opening 94 of the end plate or flange 38 by appropriate connection means. This may be by a pipe having a threaded connection into the trunk line 20 (or to a fitting on the line) and a tightly press-fit connection into the end plug 38, if the member 38 is elastomeric. If the member 38 is metal, it may be threaded, and a connector 96 having threads on one end may be used as part of a connection between the two air conduits 26 and 20. Because relatively low pressure is involved in the air or gas distribution system, generally under about 10 psig, and because both the trunk air distribution line 20 and the end of the beam 26 are stably supported on a firm surface such as the concrete rim of a tank, the connection by the member 96 can be made via press-fit, if desired, without threads. FIG. 5 shows a clamp coupling 98, of the type used on no-hub domestic sewer pipe, connecting the member 96 together with a fitting 99 on the line 20.

Figure 6:
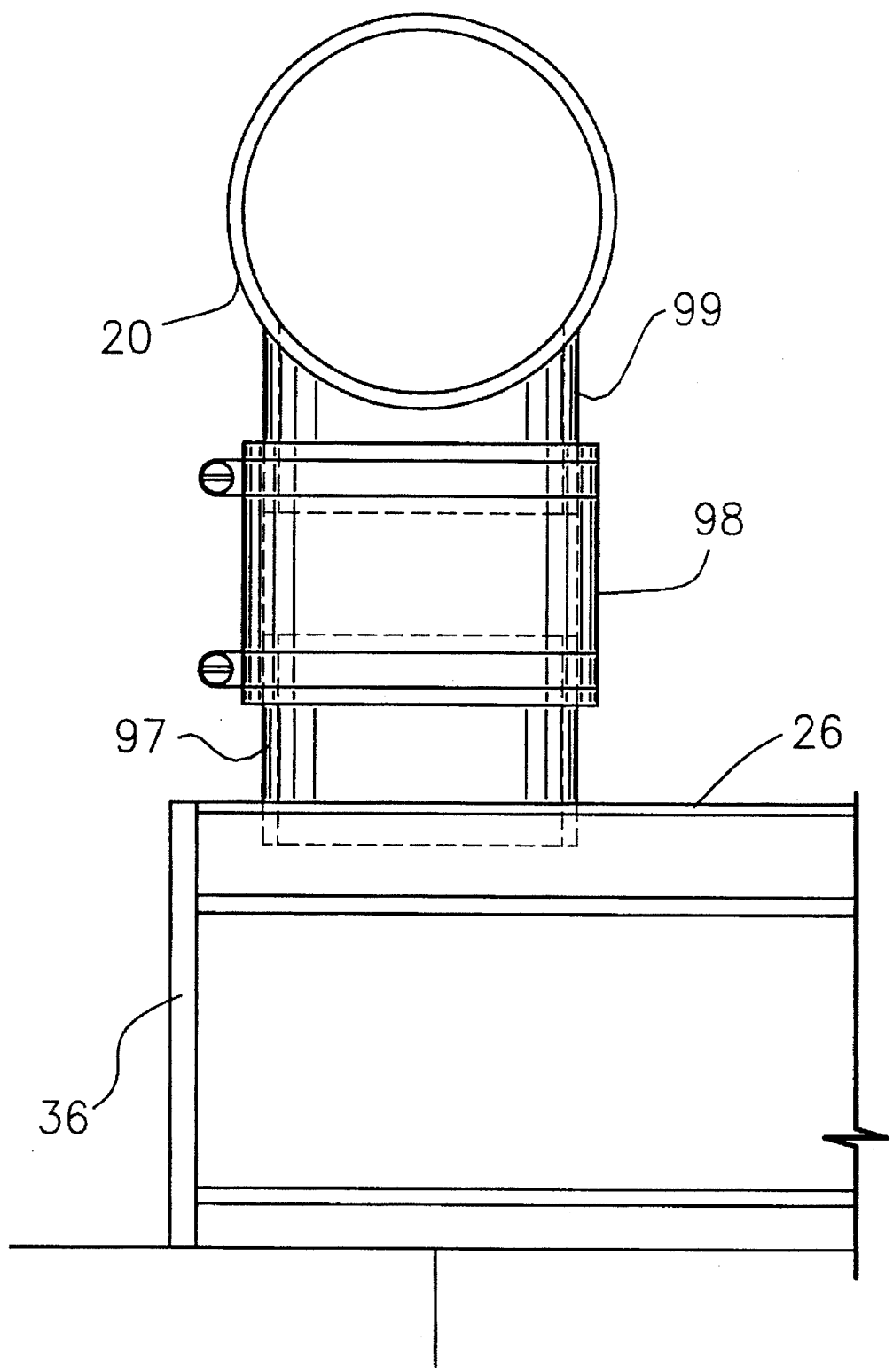
FIG. 6 is a view similar to FIG. 5 but showing another arrangement for attachment of the hollow structural beam to the gas distribution tube.

FIG. 6 shows an alternative arrangement wherein the distribution line 20 is positioned above the end of the hollow structural beam 26. A closure plate 36 is affixed to the end of the beam 26, to seal it against leakage, as in the plate 36 indicated in FIG. 2. Again, this can be an aluminum plate welded onto the end of an aluminum beam, a plate screwed into place with an appropriate gasket, or a tightly press-fit elastomeric member which is resistant to UV radiation. The air distribution line 20 is connected into the top surface of the structural beam 26 by a connector 97 which may be similar to the connector 96 shown in FIG. 5; that is, it can be a pipe nipple with reverse threads at one end, it can be threaded to one of the tubes 20 or 26 and press-fit into the other, or it could be press-fit through elastomeric connections to both the tubes 20 and 26. FIG. 6 shows a clamp coupling 98, as in FIG. 5, used to connect the connector 97 to a fitting 99 on the line 20.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A tank cover structure spanning over a tank adapted to contain a liquid, the tank cover structure forming a substantially gas tight cover over the tank and including a gas distribution system for delivering gas to be bubbled up through liquid in the tank at multiple locations, comprising:

at least one tank cover having one or more structural beams spanning across at least a portion of the distance spanned by the tank cover and supporting at least a portion of the tank cover, the beam having a closed, generally tubular cross section, gas delivery means connected to at least some of said beams so as to establish fluid communication with the interior of the beam, and gas bubbling means connected to the beam at selected spacings, each gas bubbling means including a substantially gas tight connection with the beam, a drop pipe extending downwardly into the tank, and a gas bubbler outlet on the drop pipe at a position lower than the beam, positioned to be submerged in the liquid in the tank.

2. The apparatus of claim 1, wherein the gas bubbling means includes an orifice member accessible from above the liquid in the tank, including means for receiving pressurized gas from the structural beam and an outlet orifice of preselected size positioned to deliver pressurized gas down through the drop pipe and through the gas bubbler outlet.

3. The apparatus of claim 2, wherein the orifice member comprises a generally cylindrically-shaped member having external threads, installed vertically in the gas bubbling means with the outlet orifice downward, and wherein the gas bubbling means includes a generally tubular sleeve secured to the beam in a sealed connection and oriented vertically, with internal threads at the top of the sleeve and generally at the top of the beam, the generally tubular sleeve and internal threads being positioned in a hole in the top of the beam and sized to receive the externally-threaded orifice member in sealed relationship, whereby the orifice member can easily be removed for inspection or service.

4. The apparatus of claim 3, wherein the generally tubular sleeve comprises an upper sleeve and a lower sleeve, with the lower sleeve fitted upwardly into a hole in the bottom of the beam, the lower sleeve being sealingly engaged with the bottom of the beam and sealingly connected to a lower end of the upper sleeve, the lower sleeve further being connected at its lower end to an upper end of the drop pipe.

5. The apparatus of claim 4, wherein the lower sleeve comprises an elastomeric material, whereby vibrations from the drop pipe are damped by the lower sleeve.

6. The apparatus of claim 5, wherein the upper and lower sleeves include cooperative screw threads connecting them together, said elastomeric material serving to form a sealed connection.

7. The apparatus of claim 1, wherein the beam of the tank cover is substantially rectangular in cross sectional shape.

8. The apparatus of claim 1, further including at least one observation opening in the tank cover at a position so as to enable visual observation of the gas bubbler outlets to determine any blockage of a gas bubbler outlet, with plug means for installation into the observation opening and for substantially sealing the observation opening.

9. The apparatus of claim 1, wherein the gas bubbling means includes a generally tubular sleeve member extending vertically through the beam and secured to the beam at upper and lower sides, opening means for admitting pressurized gas from the interior of the beam into the generally tubular member, and orifice means within the generally tubular member for passing the pressurized gas downwardly, to a bottom end of the generally tubular sleeve at a controlled flow rate determined by the size of the orifice means, for delivery into the drop pipe.

10. The apparatus of claim 9, further including means at the lower end of said generally tubular member for engaging an upper end of the drop pipe in sealed relationship.

11. The apparatus of claim 10, wherein the generally tubular member includes means for damping vibrations received from the drop pipe.

12. The apparatus of claim 1, wherein the gas delivery means is connected to ends of said beams.

\* \* \* \* \*